United States Patent Office 2,912,449
Patented Nov. 10, 1959

2,912,449
METHOD FOR MAKING BIS-ALKYLATED CYCLO-PENTADIENYL COMPOUNDS

William M. Sweeney, Hopewell Junction, N.Y., assignor to Texaco Inc., a corporation of Delaware No Drawing. Application June 2, 1955
Serial No. 512,873

4 Claims. (Cl. 260—439)

This invention relates to novel organometallic compounds and to their preparation.

I have discovered that unique addition products, i.e., the adducts of my invention, can be synthesized from Grignard reagents and omega-substituted fulvene compounds. The adduct products themselves are Grignard reagents, and as such are useful in a variety of syntheses including the preparation of substituted bis-cyclopentadienyl compounds of transitional metals such as iron.

Omega substitution on a fulvene compound, i.e. fulvene and benzofulvene, exists when at least one of the hydrogen atoms on the terminal methylene group of the molecule is replaced by an organic radical. Conventional preparation of these omega-substituted materials is illustrated by the equations below showing preparation of dimethyl fulvene, dimethyl benzofulvene, phenyl fulvene and methyl ethyl fulvene.

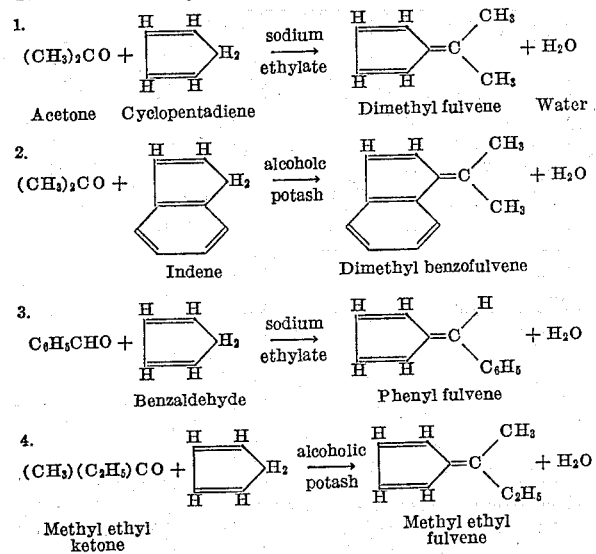

The formula

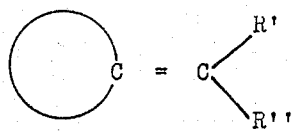

characterizes broadly the fulvene compounds for use in the practice of my invention. In the above formula the symbol

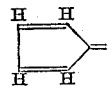

stands for the cyclopentadiene,

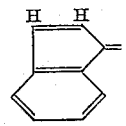

or the indene, nucleus of the fulvene compound. To one skilled in the art it is evident that one or more of the nuclear hydrogen atoms could be replaced for the purposes of my invention by a radical inert to Grignard reagent such as alkyl, aryl, triphenyl silicon, sulfide, fluoride, disubstituted amino and disubstituted phosphite.

The symbol R' in the above formula stands for a hydrogen atom or a monovalent hydrocarbon radical such as alkyl (e.g. methyl, ethyl, butyl, isoamyl), alkenyl wherein the carbon-to-carbon double bond is displaced by at least one methylene group from the joined end of the radical (e.g. 2-butenyl, 2-pentenyl), aryl (e.g. phenyl, biphenyl, naphthyl), araliphatic (benzyl, tolyl and cycloaliphatic (e.g. cyclohexyl, cyclopentyl). The symbol R" stands for a monovalent hydrocarbon radical which can be the same as or different from the radical R' in the event that the omega carbon atom of the fulvene compound is disubstituted. Alternatively, the radicals R' and R" can be linked as components of a cyclic radical such as cyclohexyl, the fulvene compound in such case being formed by reaction of cyclohexanone and the multiply-conjugated hydrocarbon. It is conceivable also that one or more hydrogen atoms on the radicals R' and R" can be substituted also by other radicals inert to Grignard reagent. Preferably, for highest yields in the practice of our invention, the fulvene compound is methylene cyclopentadiene disubstituted on its omega carbon atom by a pair of lower alkyl radicals each having from 1 to 8 carbon atoms.

Grignard reagents suitable for use in the practice of my invention are the familiar and comparatively stable RMgX compounds wherein X stands for a halogen atom, preferably chlorine or bromine, and the radical R is alkyl (e.g. methyl) aryl (e.g. phenyl), araliphatic (e.g. benzyl) or alkenyl (e.g. allyl), preferably a lower alkyl radical having 1 to 8 carbon atoms. It is conceivable also that one or more hydrogen atoms on the radical R can be substituted also by other radicals inert to Grignard reagent.

The stability of the Grignard reagent makes for a simple preparation of the adducts of my invention. The adduct-forming reaction is conducted in the medium of an indifferent solvent (i.e. not causing the Grignard reagent to decompose), preferably diethyl ether advantageously unseparated from the manufacture of the Grignard reagent, but also suitably xylene, light petroleum naphthas such as petroleum ether, higher aliphatic ethers, anisole and tertiary amines. The reacting mixture should be protected from moisture and from the presence of carbon oxides, suitably by blanketing with dry nitrogen. The reaction proceeds rapidly by mixing the reactants at about room temperature or below to form the adduct, but temperatures broadly in the range of about 20° to about 250° F. can be used. For efficiency and economy in the preparation of the adduct approximately equimolar (stoichiometric) portions of the fulvene compound and of the Grignard reagent are used.

The adducts of my invention can be characterized broadly by the formula:

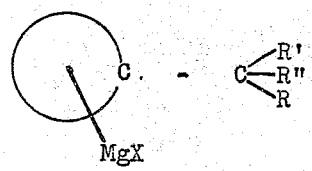

wherein the Grignard reagent adds to eliminate the carbon-to-carbon double bond joining the omega carbon atom to the five-membered ring, the radical R being furnished by the Grignard reagent and the MgX residue directing itself to said ring. The radicals R' and R" are from the fulvene compound previously described.

The adduct formation is believed to follow the course as illustrated by Equation 5, below, wherein dimethyl fulvene is reacted with ethyl magnesium chloride.

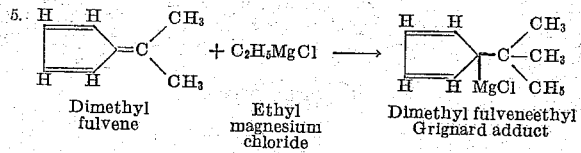

Adducts of omega monoaliphatic hydrocarbon substituted fulvene or omega dialiphatic hydrocarbon substituted fulvene with an aliphatic hydrocarbon Grignard reagent are believed to correspond to the product of Equation 5, that is

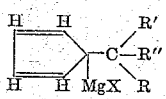

wherein the radicals R and R" are aliphatic hydrocarbon radicals, preferably lower alkyl radicals of 1 to 8 carbon atoms; and the radical R' is a hydrogen atom or an aliphatic radical, preferably a lower alkyl radical of 1 to 8 carbon atoms.

Salts of many polyvalent metals of groups IV to VIII of the periodic table combine readily with two mols of the adduct of my invention to replace MgX groups and to make a wide variety of substituted bis-cyclopentadienyl complexes. Many of such complexes exhibit antiknock characteristics when blended with gasoline, or smoke repression tendencies when mixed into heating oil or rocket and lamp fuels. Being highly substituted, the complexes can be blended readily with hydrocarbons.

Suitable polyvalent metal salts for the preparation contain the following metallic ions (the Roman numerals pertain to the oxidation state of the metal): iron II and III, chromium II, ruthenium II and III, cobalt II and III, rhodium III, iridium III, nickel II and III, manganese II, molybdenum IV and V, tungsten IV and V, titanium III and IV, zirconium IV, vanadium III and IV, niobium V and tantalum V. Halides and acetylacetonates, particularly chlorides of these metals, are preferred for preparation of the bis-substituted cyclopentadienyl materials. Broadly, the useful metals in such preparation have been called "transition elements" in the field of bis-cyclopentadienyl compounds and such term used herein will be considered to be synonymous with the metals listed above.

The medium for this reaction is also an indifferent solvent like those mentioned hereinbefore and preferably is diethyl ether. For efficiency and economy in the preparation of the transitional metal compound about stoichiometric proportions, i.e. 2 mols of the adduct per mol of metal salt plus enough excess to reduce anything reducible in the reaction mixture (for example, ferric to ferrous iron) are used, and the adduct is not isolated from its solvent vehicle. The preferred temperature for the reaction is about room temperature but higher and lower temperatures between about minus 20° and plus 150° F. can also be used.

The formula below characterizes broadly the compound resulting from the reaction of a transition element halide with the adducts of my invention:

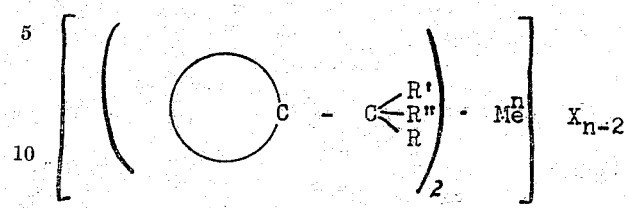

wherein X is a halogen atom, Me the transition element atom, and $n$ an integer from 2 to 5 signifying the oxidation state of the element after the reaction.

Purification of the bis-substituted cyclopentadienyl-transition element complex can be accomplished by extraction with an organic solvent, drying, and distilling if liquid or recrystallizing if a solid.

The following examples show ways in which my invention has been practiced, but are not to be construed as limiting the invention.

*Example 1.*—0.574 mol of omega dimethyl fulvene,

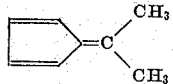

and 0.8 mol of ethyl magnesium bromide were mixed at room temperature in 4.8 mols of dry diethyl ether. Heat was given off but no gases were evolved. 0.25 mol of anhyrous ferric chloride, dissolved in 2.9 mols of dry diethyl ether, was dropped slowly into the adduct solution with stirring. Heat was given off and a red-black color developed during the addition of the iron solution. The mixture was then poured into an aqueous solution of ammonium chloride having concentration of 20 grams of ammonium chloride per hundred ml. of water. The resultant material was stirred and filtered, then benzene was added to separate the organic layer. The organic layer was dried with anhydrous potassium carbonate and the solvents evaporated leaving a deep red-black oily residue. This oil was fractionally distilled yielding a red-black oil having boiling point of 115° C. at 0.8 mm. Hg pressure, refractive index

of 1.581, and density

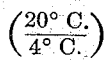

of 1.146. The purified material deposited a typical iron residue on firing in a porcelain dish and developed a blue color when mixed with nitric or sulfuric acids.

Infrared spectroscopic analysis of the material showed a C–H band at 3.26 microns which is typical of biscyclopentadienyl compounds. Analysis of the compound showed 17.4% iron, 70.9% carbon and 7.7% hydrogen. Calculated analysis for the composition

is 17.2% iron, 73.6% carbon and 9.2% hydrogen. These data indicate the formation of a Grignard adduct with the omega dimethyl fulvene and formation of its dicyclopentadienyl iron derivative wherein the cyclopentadiene nuclei are linked to carbon atoms having appended thereto a pair of methyl radicals and an ethyl radical.

*Example 2.*—About 0.75 mol of omega monomethyl fulvene,

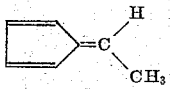

and 0.8 mol of ethyl magnesium bromide were mixed at room temperature in 4.8 mols of dry diethyl ether with evolution of heat. 0.234 mol of anhydrous ferric chloride dissolved in 2.9 mols of dry ethyl ether was dropped slowly into the adduct solution with stirring. The reaction product was then purified as described in Example 1 to yield a liquid having boiling point of 126–174° C. at 1.0 mm. Hg pressure, refractive index $$\left(\frac{20}{D}\right)$$

of 1.5596, and density $$\left(\frac{20°\ C.}{4°\ C.}\right)$$

of 1.087. This material gave an iron oxide residue of firing and a blue color when mixed with nitric and sulfuric acids.

Obviously many modifications and variations of the invention, as hereinbefore set forth, may be made without departing from the spirit and scope thereof and, therefore, only such limitations should be imposed as are indicated in the appended claims.

I claim:

1. A process for preparation of bis-alkylated cyclopentadienyl iron which consists essentially of: mixing a fulvene having the formula

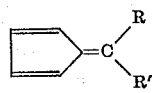

where R is a lower alkyl radical and R' is a radical selected from the group consisting of lower alkyl radicals and the hydrogen atom, with a lower alkyl magnesium halide in the medium of an inert solvent, thereby forming the adduct of said fulvene compound and the alkyl magnesium halide; reacting an inorganic iron salt with said adduct in said solvent; and recovering a bisalkylated cyclopentadienyl iron from the resulting mixture.

2. The process of claim 1 wherein the fulvene is a dialkyl fulvene.

3. The process of claim 1 wherein the fulvene is a monoalkyl fulvene.

4. The process of claim 1 wherein the inorganic salt used is an iron chloride.

References Cited in the file of this patent

Kealy et al.: "Nature," vol. 168, pp. 1039–40 (1951).

Fuson and Mumford: J. Org. Chem., vol. 17 (1952), pp. 255–261.

Fuson and York: J. Org. Chem., vol. 18 (1953), pp. 570–574.